Figure 1:
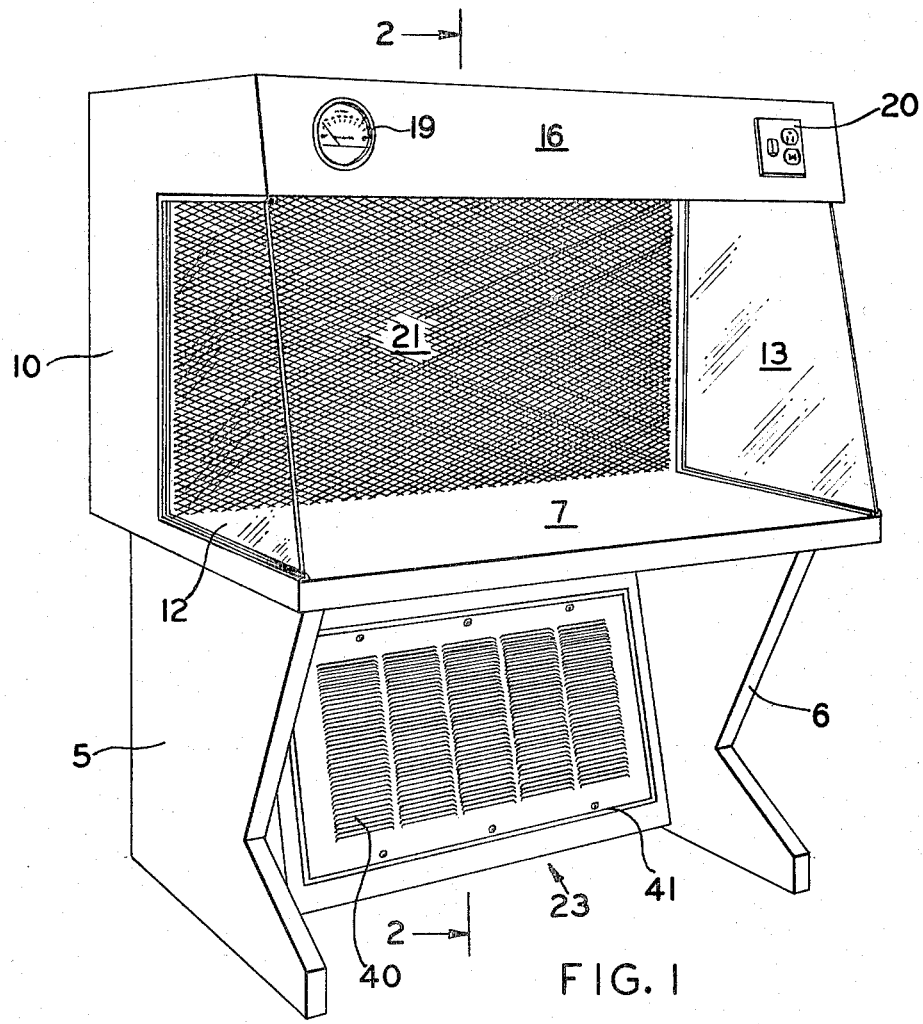

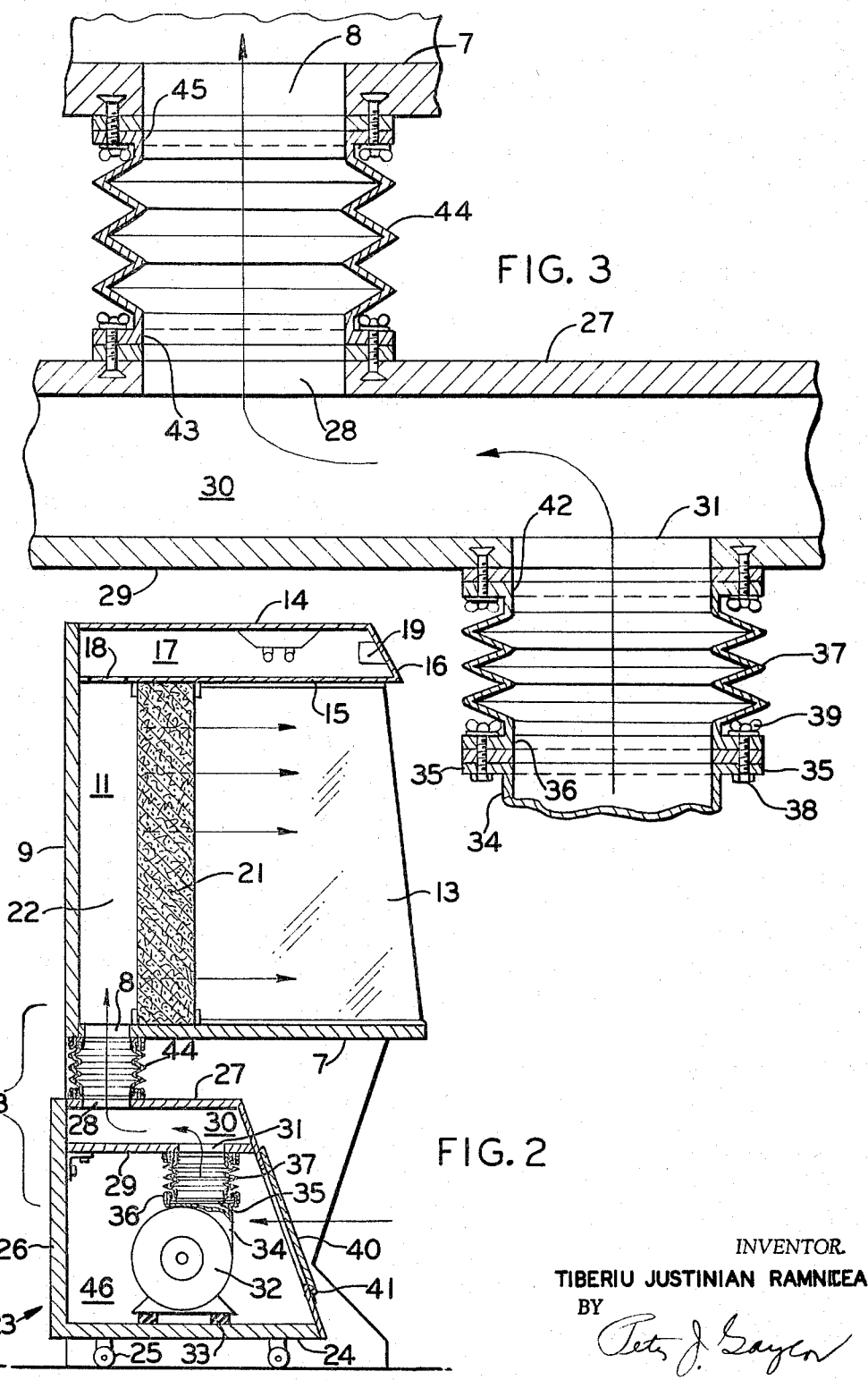

United States Patent Office 3,284,148
Patented Nov. 8, 1966

3,284,148
BLOWER-CONTAINED VIBRATION-FREE
WORK BENCH
Tiberiu Justinian Ramniceanu, 18 4th St.,
South River, N.J.
Filed Feb. 24, 1965, Ser. No. 434,925
1 Claim. (Cl. 312—209)

This invention deals with a blower-contained vibration-free work bench wherein a blower forces air, or other gas, upwardly into a plenum chamber, and thence out through filter or air-directing means, and finally over the working platform over which the work is disposed. More specifically, it relates to a blower mounted in a housing or case, separately isolated from the work bench, but flexibly connected thereto by means of a flexible duct, said case having an ante-plenum chamber with air inlet opening in staggered relation to the air exit opening, said ante-plenum inlet being flexibly connected, by means of a flexible duct or conduit, to the air blower discharge.

Work benches have been available in the prior art in which a blower is mounted within the bottom portion of the bench, said blower having its outlet directed into a plenum chamber, from which the air is forced through a filter or air-directing means and over the work bench platform, over which the work is placed. Such benches have been found to be subject to considerable vibration which not only is disturbing to the operator, but also has a detrimental effect upon the work placed on the platform, and it also reduces the accuracy of the operator's work. Furthermore, the air pressure has been found to be much greater at the top of the plenum chamber, so that more air is forced out near the top of the bench than over the work platform.

According to the present invention, a work bench is provided wherein the work platform and bench itself are substantially free from vibration due to the air blower, and the air pressure in the plenum chamber is equally distributed therein. The invention will be more readily understood by reference to the accompanying drawings in which a preferred embodiment is described, and in which a laminar flow, ultra-clean work bench is used as an example. In these drawings, FIGURE 1 depicts a perspective front elevational view of a work bench incorporating the present invention. FIGURE 2 presents a cross-sectional elevational side view taken along the plane of line 2—2 in FIGURE 1. FIGURE 3 is an enlarged cross-sectional side view of the portion bracketed as "3" in FIGURE 2, and incorporating the essential features of the present invention. The same numerals refer to similar parts in the various figures.

Referring again to the drawings numerals 5 and 6 represent a pair of legs on which is mounted working platform 7. In the rear portion of platform 7 is opening 8 serving as an entrance to the plenum chamber. Behind opening 8 is a vertical back wall 9, and projecting forwardly from wall 9 are sides 10 and 11 which extend forwardly over the side edges of platform 7. A portion of each of the sides may be of a transparent material 12 and 13, such as transparent plastic.

Extending forwardly from the top of back 9 is top 14. Below it, and extending forwardly in a similar manner is a horizontal panel 15 which, with top 14, and front panel 16, form a chamber 17. A hole 18 is made in the rear portion of panel 15, to serve as an air entry into chamber 17, so that instruments, such as pressure gauge 19 may be used to read the air pressure therein. Front panel 16 also may serve to hold lighting, control switches, plug outlets 20, and other facility connections required by the operator working at the bench.

Mounted vertically in front of opening 8 and between platform 7 and panel 15, is the laminar flow sub-micron filter 21 which is tightly held, in gasketed relation, so that no air leakage occurs around said filter. Thus, it will be noted that a plenum chamber 22 is formed between back wall 9 and filter 21.

Between legs 5 and 6, there is disposed a portable cabinet or case, indicated generally as 23, and comprising a flat base 24, preferably provided with casters 25, and having a vertical rear wall 26, sides 46, and a top 27 which is disposed lower than, and in spaced relation with respect to platform 7. In the rear portion of top 27 is an opening 28 which is designed to be in alignment with opening 8 in platform 7 when the bench is in use. Disposed below, and in spaced relation with top 27, is panel 29, forming an ante-plenum chamber 30. Disposed in the forward portion of panel 29, and in staggered relation with respect to opening 28, is opening 31. An air blower 32 is mounted on cushions 33 and on base 24. A louvered cover 40, hinged at 41, is used as a front to enclose blower 32 and to serve as an air entry thereto.

Outlet 34 of blower 33 is provided with a flange 35 to which is attached, in gasketed relation, the end 36 of flexible cylindrical conduit 37, which may be in the shape of a bellows. This conduit may have a shape other than cylindrical, and it may consist of closely-woven canvas, rubber coated canvas, plastic or rubber sheeting, or the like. End 37 may be attached to blower outlet 35 by bolts 38. The other end 42 of flexible conduit 37 is similarly attached to panel 29, over opening 31, by bolts 39, in outside sealing relation thereto.

Attached to top 27, and covering opening 28, is the end 43 of flexible conduit 44, attached in a similar manner. Similarly attached to platform 7 over opening 8, is the other end 45 of flexible conduit 44.

It is thus apparent that when air blower 32 is turned on by a switch at 20, air enters louvered panel 40, passes through blower 32 and discharge 34, thence, as shown by the arrows, it passes through flexible conduit 37, through opening 31, then through ante-plenum chamber 30, thence through opening 28, flexible conduit 44, and into plenum chamber 22, where its pressure could be read on meter 19. The air then will flow, in laminar condition, through ultra-clean filter 21, and out over platform 17, thus keeping the working area clean of microscopic particles and free from vibration.

It will be observed that, by use of the ante-plenum chamber 30, pressure is equalized in the plenum chamber 11. Also, the use of the flexible conduits 37 and 44 eliminates most of the vibration normally encountered with such desks. Furthermore, the mounting of blower 32 in a separate cabinet facilitates greatly the repair and maintenance of the blower and enables use of a replacement cabinet in emergencies.

I claim:

A blower-contained vibration-free work bench of the type described, comprising,
  a work platform supported on a pair of legs and having an opening in its rear portion serving as an air entry into a plenum chamber,
  a separate cabinet disposed between said legs and in spaced relation under said platform, said cabinet having a base on which a blower may be mounted, and having a back, a top, sides, and a front, and an opening in the rear portion of its top, serving as an air outlet, and disposed in alignment with said platform opening when in use,
  a panel disposed in the upper portion of said cabinet in spaced relation below said cabinet top, thereby forming an ante-plenum chamber therewith, and having an opening in its forward portion in staggered relation to said opening in the cabinet top, a blower mounted on said cabinet base and having an outlet flange, a flexible conduit connected at its bottom to and over said cabinet top in outside sealing relation therewith, and circumscribing the opening in said cabinet top, and having its upper portion connected to and under said platform and circumscribing the plenum opening in outside sealing relation, and a flexible conduit connected at its top to the bottom of said panel in outside sealing relation therewith and circumscribing the opening in said panel, and having its lower end connected on said blower outlet flange in outside sealing relation therewith.

References Cited by the Examiner
UNITED STATES PATENTS

| 2,709,954 | 6/1955 | Baker | 98—36 |
| 2,999,448 | 9/1961 | Abler | 98—115 |

OTHER REFERENCES

Farr Clean Bench Bulletin, Copyright 1964.

CLAUDE A. LE ROY, *Primary Examiner.*

CHANCELLOR E. HARRIS, *Examiner.*